July 10, 1928.

J. NEWMANN 1,676,345

TRANSMISSION MECHANISM

Filed Oct. 26, 1926    2 Sheets-Sheet 2

INVENTOR
John Newmann
BY
P. F. Bourne
ATTORNEY

Patented July 10, 1928.

1,676,345

UNITED STATES PATENT OFFICE.

JOHN NEWMANN, OF GLENDALE, NEW YORK.

TRANSMISSION MECHANISM.

Application filed October 26, 1926. Serial No. 144,236.

My invention relates to improvements in mechanism adapted to transmit reduced speed of rotation from a prime mover or driving member to a driven member, and my invention is particularly adapted for use in hoisting apparatus wherein a rope may be wound on a drum or driven member at a desired reduced or slow speed for providing sufficient power from the prime mover.

In carrying out my invention I provide a transmission mechanism comprising a planetary gearing which may be driven from any desired prime mover or source of power, a shaft to be driven by said gearing at reduced speed, and a second planetary gearing to be operated by said shaft, a driven member or drum being connected with the second named gearing for rotation of said driven member at speed reduced from the speed of rotation of said shaft.

My invention further comprises novel details of improvement that will be more fully hereinafter set forth and then pointed out in the claims.

Reference is to be had to the accompanying drawings forming a part thereof, wherein Fig. 1 is a side elevation of transmission mechanism in the form of hoisting apparatus embodying my invention, partly in section on line 1, 1, in Fig. 3;

Fig. 4 is a section of a modification.

Similar numerals of reference indicate corresponding parts in the several views.

Figure 2:
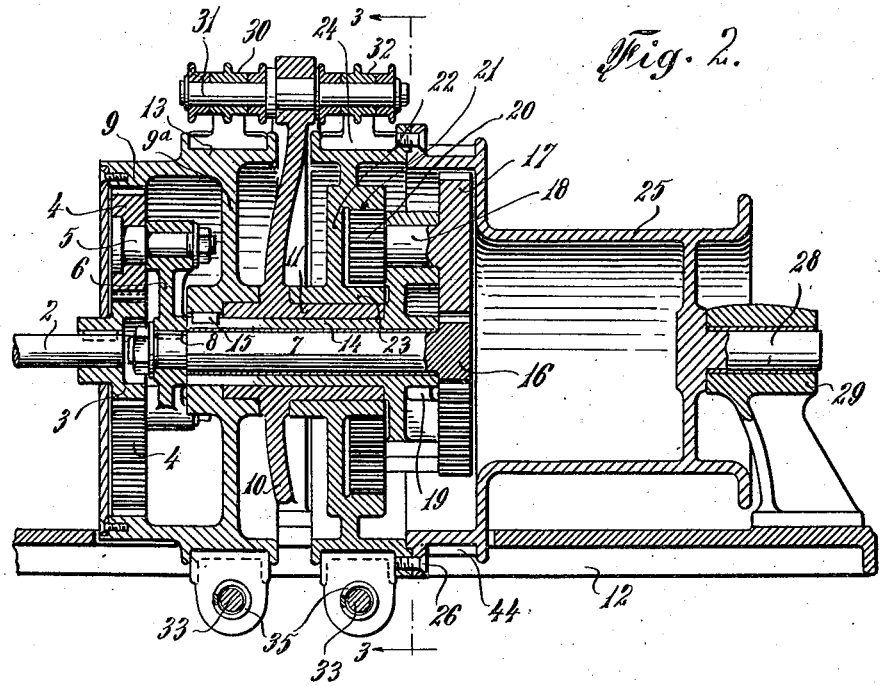
Fig. 2 is a longitudinal section on line 2, 2, in Fig. 3.

At 1 is indicated a power apparatus or prime mover which may be any suitable motor, and at 2 is a drive shaft driven by the motor and provided with a gear 3 of a planetary transmission gearing or mechanism. The gear 3 is in mesh with one or more pinions 4 of the planetary gearing whose gudgeons or pivots 5 are secured to a spider or support 6 that is secured to a driven shaft 7, as by a key at 8. An internal gear of the planetary transmission is indicated at 9 in mesh with the pinions 4. A support or frame 10 is shown provided with a bearing 11 within which the shaft 7 is journaled. The support 10 is carried by or provided with a suitable base 12. The internal gear 9 is shown provided with an annular drum or braking surface at 13, and said internal gear is secured to a tubular shaft or bushing 14 by means of a web 9ª and a key at 15, within which tubular shaft 14 the shaft 7 is rotative, said tubular shaft being shown journaled within the bearing 11. The shaft 7 actuates a second planetary gearing and is provided with a gear at 16 in mesh with one or more pinions 17 whose shafts or pivots 18 are journaled in a spider or support 19 that is secured to or formed with the shaft 14. The shafts or pivots 18 are provided with pinions 20 that are in mesh with internal gear 21 of the second planetary gearing shown provided with a supporting web 22 having hub 23 that is shown journaled upon the bearing 11. The internal gear 22 is provided with an annular braking surface or drum 24. The internal gear 21 is to operate a driven member which I have shown in the form of a drum 25 detachably secured to said internal gear by screws or the like 26, around which drum a rope or flexible connection 27 is adapted to be wound for raising and lowering weighted objects. The drum 25 is shown provided with a pivot or gudgeon 28 journaled in a bearing 29 supported on base 12, (Fig. 2).

Figure 1:
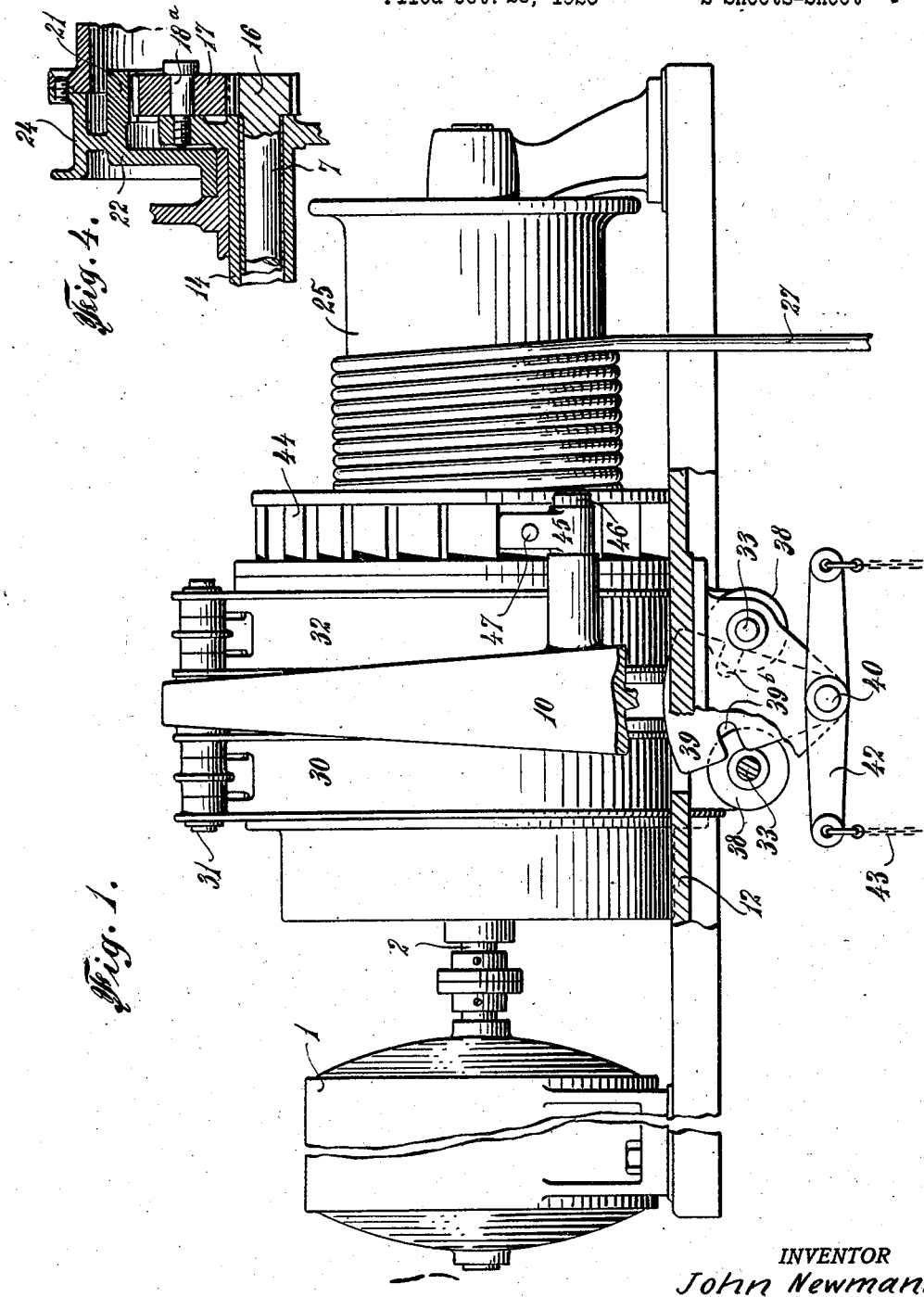
Figure 3:
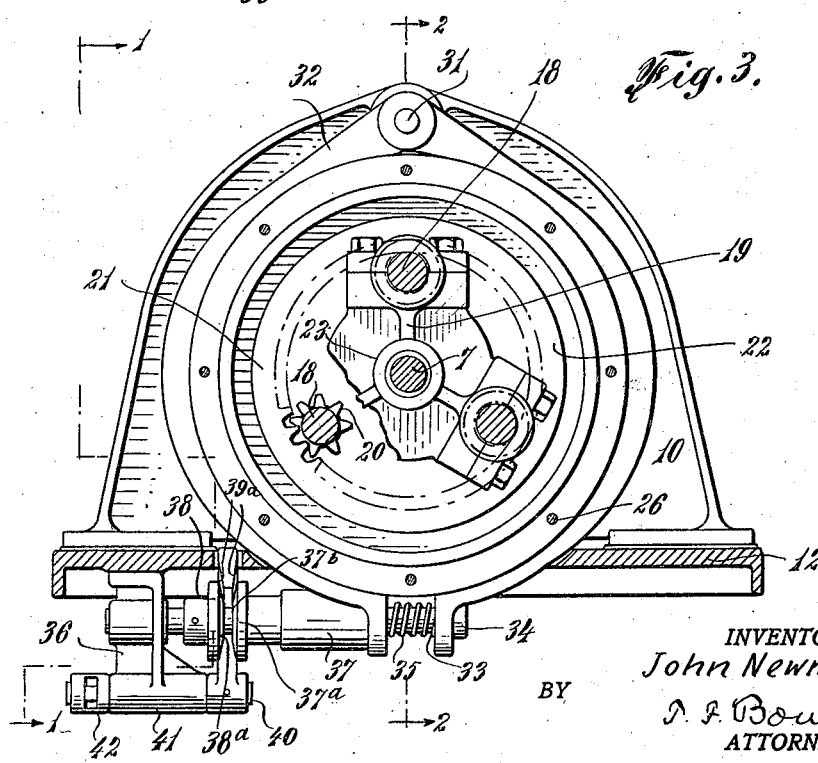
Fig. 3 is a cross section substantially on line 3, 3, in Fig. 2.

Any suitable braking means may be provided for controlling the rotation of internal gearing 9 by engagement with its braking surface 13. I have illustrated the brake band at 30 encircling the surface or drum 13 and comprising two members pivotally supported upon pin 31 carried by frame 10. The free ends of the brake band are to be drawn together for gripping the surface of drum 13 and are to spread to release the same. A brake band 32, shown comprising two members, encircles the braking surface or drum 24 and is supported by pin 31, (Fig. 2). I provide means to operate either of the brake bands at will, the construction being the same for each band as follows: the ends of the brake band are provided with holes slidably receiving rod 33 having a head at 34 at one end bearing against one member of the brake band, (Fig. 3), a spring 35 between the ends of the brake band members serving normally to spread them to release the adjacent annular surface. The rod 33 is slidably supported in bracket 36 and upon said rod is a slidable sleeve 37, one end of which bears against the free end of one of the brake members, and the opposite end is provided with a head 37ª, the outer surface of which is shown convex at 37ᵇ. Spaced from the head 37ª is a stop 38 that is secured upon rod 33 and is provided with a convex end surface 38ª opposing and spaced from the surface 37ᵇ of sleeve 37. A controlling member 39 is pivotally supported between the spaced rods 33 to be rocked, which member is secured upon a shaft 40 journaled in bracket 41 secured to the base. Shaft 40 is provided with operating means shown in the form of a lever or arm 42 secured thereto, which may be operated in any desired way, such as by chains at 43. The member 39 is provided with wedge-like portions at 39ª on opposite sides, (Fig. 3), adapted to pass respectively between the head 37ª and stop 38 of either brake band when the member is tilted by the lever 42 in one direction or another to control the brake band 30 or 32 as desired. The member 39 is shown provided with recesses 39ᵇ on opposite sides to accommodate the corresponding rod 33 when the member is rocked to one side or another. When member 39 is rocked to the left in Fig. 1, the brake band members 30 will be caused to grip the annular surface or drum 13 for retarding or stopping the internal gear 9, and when the member 39 is rocked to the right in Fig. 1 to operate the brake band 32 the drum 25 may be retained or retarted to stop a weight carried by rope 27 at a desired height or to allow the weight to descend slowly, or as desired. The drum 25 is shown provided with backstop ratchet teeth 44 adapted to be engaged by dog 45 pivotally supported upon the support 10 at 46, which dog is provided with a projection at 47 to permit manipulating it. The dog 45 will be engaged with a tooth 44 when it is desired to stop rotation of drum 25 so as to retain a weight in an elevated position.

In the modification shown in Fig. 4 the pinion 20 is omitted and the internal gear 21 is directly in mesh with the pinion 17. The pinion 17 is mounted to rotate on the spindle 18ª which is secured to the spider 19. The operation of the parts is similar to that described, except that the ratio of gearing is different.

The operation may be described as follows: when shaft 2 is rotated and the brake band 30 is applied to the surface or drum 13 the internal gear 9 and the support or spider 19 will be held from rotation. The rotation of shaft 2 will drive pinion 3 which will cause axial rotation of the pinions 4 which, traveling within the internal gear 9, will cause rotation of spider 6, thereby rotating the shaft 7 and the pinion 16. The rotation of pinion 16 will cause axial rotation of the pinions 17, (because the spider 19 is held from rotation by the gear 9), and the axial rotation of pinions 17 will cause rotation of pinions 20 which will rotate the internal gear 21, whereby the drum 25 will be rotated for operating rope 27 to raise an object or perform other work. The rotation of shaft 7 by the planetary gearing 3, 4, 9, etc. will be at a speed reduced from the speed of rotation of the driving member or shaft 2, in accordance with the ratio of the gearing, and the rotation of drum 25 will be greatly reduced below the rotation of shaft 7 by reason of the planetary gearing 16, 17, 20 and 21, the ratio of which last named gearing may be such as desired. It will be understood that the reduction of speed of the driven member or drum 25 below the speed of the driving member or shaft 2 may be such as desired, according to the ratio of the gearing, as shown, say, 25 to 1 up to 50 to 1. By releasing surface or drum 13 and retaining or retarding the surface or drum 24 the drum 25 may be retarded for lowering an object on the rope, and the gearing may rotate freely during continued rotation of shaft 2 since the internal gear 9 will be free for axial rotation.

In accordance with my invention a simple, direct acting and inexpensive transmission mechanism is provided for the purpose intended which will be relatively cheap to manufacture and not liable to get out of order, since the gears are of an ordinary variety compactly arranged for producing a relatively great reduction of speed of the driven member or drum 25 from the driving member or shaft 2 so the lifting power of the drum is large.

While I have referred to the construction described as a hoisting apparatus it will be understood that the same may be used for any other desired purpose to be operated from the driven member in any desired way.

Having now described my invention what I claim is:—

1. An apparatus of the character set forth comprising a planetary tranmission mechanism including an internal gear and having a driven shaft concentric with said gear and brake means for said internal gear, a second planetary transmission mechanism including an internal gear and having one of its gears driven by said shaft for rotating its internal gear, part of said second planetary transmission being controlled with the first named internal gear by said brake means, driven means operative by the internal gear of the second named planetary transmission mechanism, and brake means for retarding rotation of the said driven means.

2. An apparatus of the character set forth comprising a planetary transmission mechanism including an internal gear and provided with a spider, a shaft secured thereto, and brake means for said internal gear, a second planetary transmission mechanism including an internal gear and having a gear connected with said shaft and having a spider connected to the internal gear of the first named planetary transmission mechanism, driven means operative by the internal gear of the second named planetary transmission mechanism, and brake means for retarding rotation of the driven means.

3. An apparatus of the character set forth comprising a driving member provided with a gear, an internal gear, a spider having one or more pinions in mesh with said gears, a shaft secured to said spider, brake means for the internal gear, a gear secured to said shaft, a spider rotative concentrically respecting said shaft and provided with one or more pinions driven by the last named gear, said spider being connected to said internal gear, a second internal gear driven by said last named pinions, driven means operative by said second named internal gear, and brake means for controlling rotation of the driven means.

4. An apparatus of the character set forth comprising a driving member provided with a gear, an internal gear, a spider having one or more pinions in mesh with said gears, a shaft secured to said spider, brake means for the internal gear, a gear secured to said shaft, a spider rotative concentrically respecting said shaft and provided with one or more pinions driven by the last named gear, said spider being connected to said internal gear, a second internal gear driven by said last named pinions, a drum operative by the second named internal gear, and brake means for controlling the rotation of said drum, the first named internal gear operating idly when the drum is retarded.

JOHN NEWMANN.